United States Patent [19]
Champleboux et al.

[11] 3,972,354
[45] Aug. 3, 1976

[54] SELF-FLOATING FLEXIBLE PIPE

[75] Inventors: Jacques Champleboux, Clermont-Ferrand; Franck Tailhardat, Chamalieres; Charles Moreau, Clermont-Ferrand, all of France

[73] Assignee: Pneumatiques, Caoutchouc Manufacture et Plastiques Kleber-Colombes, France

[22] Filed: Feb. 5, 1974

[21] Appl. No.: 439,718

[30] Foreign Application Priority Data
Feb. 5, 1973 France .............................. 43.04034

[52] U.S. Cl. ............................... 138/103; 138/133; 138/DIG. 9
[51] Int. Cl.² ..................... F16L 11/08; F16L 11/12
[58] Field of Search .......... 138/103, 106, 127, 133, 138/138, 145, 146, 153, DIG. 7, DIG. 9

[56] References Cited
UNITED STATES PATENTS

| | | | |
|---|---|---|---|
| 132,006 | 10/1872 | Harris | 138/138 |
| 702,738 | 6/1902 | Montgomery | 138/133 |
| 1,206,230 | 11/1916 | Kincaid | 138/133 |
| 1,281,557 | 10/1918 | Goodall | 138/133 |
| 3,119,415 | 1/1964 | Galloway et al. | 138/103 |
| 3,548,884 | 12/1970 | Ambrose | 138/153 |

Primary Examiner—Richard E. Aegerter
Assistant Examiner—Richard R. Stearns
Attorney, Agent, or Firm—Craig & Antonelli

[57] ABSTRACT

A self-floating flexible pipe for use with off-shore petroleum installations, which includes an inner reinforced pipe for conducting fluids which is surrounded by a layer of cellular material for assuring permanent floatation of the pipe. In order to protect the cellular layer, an outer reinforcing sheathing formed of helically wound metallic cables embedded in a rubber layer is provided. These helically wound metallic cables are wound at a setting angle with respect to the longitudinal axis of the pipe in the range of 56° to 68° so as to minimize the effect of these armoring cables on the flexibility of the overall pipe construction. These armoring cables are also preferably resilient in a longitudinal direction, with preferred embodiments including undulated cables so as to further lessen the impact of these cables on the flexibility of the pipe. An outer covering layer of polychloroprene is provided on the rubber layer within which the cables are embedded for protecting this rubber layer.

6 Claims, 4 Drawing Figures

SELF-FLOATING FLEXIBLE PIPE

BACKGROUND AND SUMMARY OF THE INVENTION

The present invention relates to self-floating flexible pipes (or tubes), such as the lines of pipes of rubber or of an analogous material, which when connected to a petroleum installation permits off-shore filling of transport ships with petroleum products. In use, such a line of pipes consisting of self-floating pipes is left permanently floating on the water in a manner such that the personnel of a ship can easily locate same, seize a free end from the bridge of the ship, and connect this end to a duct (or line) leading to petroleum tanks.

A self-floating flexible pipe of this type comprises a reinforcing sheathing (reinforcing armature or armoring layers) which is placed in a rubber wall at the pipe and a layer of cellular material which covers the entire exterior face of this rubber wall. This cellular material, in which the majority of the cells are closed, which means that they do not communicate with each other, assures the floating of the pipe on the water. However, this cellular material layer is fragile because of the fact that it is very sensitive to deformations and is not very resistant with a consequent very rapid deterioration of the pipe to a non-usable condition due to the abrasion of the cellular material. In particular, such abrasion results in use of such pipes because in order to connect the free end of the pipe line to the duct of petroleum tanks, this cellular material layer is manipulated and bent under extremely severe conditions with contact with metallic parts of the ship.

It is contemplated by the present invention to provide a self-floating pipe of the type discussed above which does not have the above discussed disadvantages and without, however, interfering with advantageous intrinsic properties of the pipe (or tube) itself, particularly as far as the pipes longitudinal flexibility is concerned.

The present invention contemplates providing a peripheral layer of metallic cables or analogous elements having a high mechanical resistance on the exterior face of the cellular material of the self-floating pipes. The present invention further contemplates placing such cables side by side and winding them according to a setting angle in the range of 56° to 68° with respect to the longitudinal axis of the pipe. These cables form part of a sheathing skin on the radial outward surface of the layer of cellular material which is resistant against abrasion and shocks and thereby protects the cellular material. These cables play no role whatever in the armature (or armoring) of the pipe portion conducting the fluids, which pipe portion is on the radial inner surface of the layer of cellular material. Due to the configuration and orientation of the cables, they do not impair the longitudinal flexibility of the pipe.

The cables used in the peripheral layer surrounding the cellular material in the present invention are preferably metallic cables which display an elastic elongation, or cables on which the permanent undulations are produced for accommodating elastic elongation and retraction.

These and further objects, features and advantages of the present invention will become more obvious from the following description when taken in connection with the accompanying drawing which shows, for purposes of illustration only, several embodiments in accordance with the present invention.

DETAILED DESCRIPTION OF THE DRAWINGS

Figure 1:
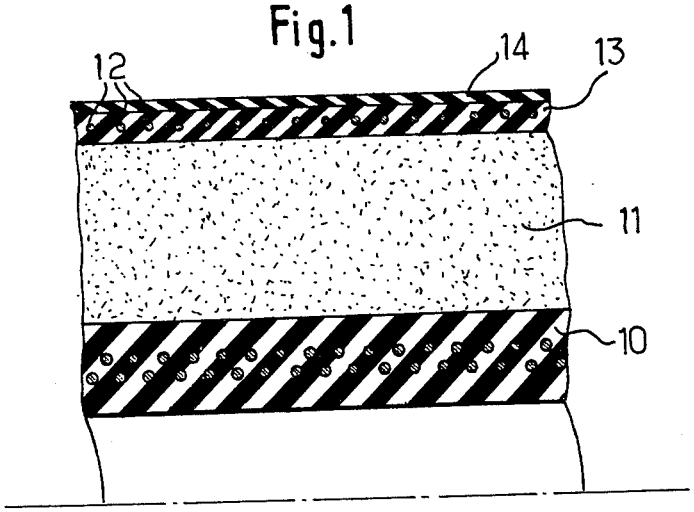
FIG. 1 is a cross-sectional view showing one radial half of a section of a self-floating pipe constructed according to the present invention.

The self-floating pipe of FIG. 1, which has an inside diameter of 400 mm is designed for an off-shore petroleum installation. FIG. 1 only shows one radial half of the pipe, it being understood that the other radial half is of similar configuration such that a fluid conducting opening is formed inside of the interior reinforced pipe portion 10. This pipe portion 10 includes armoring members embedded or enveloped in rubber (see the schematic representation of these armoring members as cross hatched circles in pipe portion 10 shown in FIG. 1). The outer surface of this pipe portion 10 is covered with a layer 11 of cellular material which has the majority of the cells thereof closed in such a manner as to assure suitable floatability of the pipe. The basic combination of the interior pipe portion 10 and the surrounding layer of cellular "material" provides the basis for the improvement for the present invention, which improvement is described in detail in the following paragraphs.

In surrounding engagement with layer 11, a rubber layer 13 is provided which has helically wound metallic cables 12 embedded therein in such a manner that the cable windings are integrally connected with adjacent cable windings by means of the rubber in layer 13. The group of cables 12, by virtue of their hardness, in conjunction with the rubber layer 13, constitute a homogenous protective sheath or skin on the layer of cellular material 11, which protects the cellular material layer 11, against abrasion and exterior shock during use of the pipe.

Figure 2:
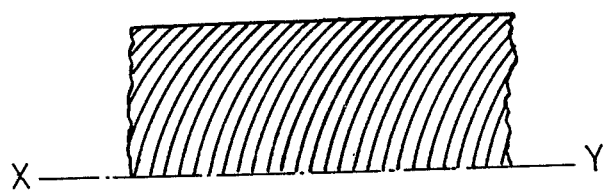
FIG. 2 is a schematic plan view depicting the orientation of the cables 12 of the FIG. 1 pipe with respect to the projection of the longitudinal axis of the pipe.

As best illustrated in FIG. 2, the cables 12 are helically wound at an angle slightly greater than 55° with respect to the axial direction X—Y of the pipe. By this inclination of the helical windings of the cables 12, the flexibility of the composite self-floating pipe is substantially uneffected by the inclusion of the protective layer 13 with metallic cables 12. According to the invention, the preferrred range of the setting angle of the cables 12 with respect to the pipe longitudinal axis X—Y is in the range between 56° and 68°. In a particularly preferred embodiment of the present invention, this setting angle is approximately 60°.

The cables 12 are configured so that they do not display a permanent elongation as long as their elongation does not reach 90% of the elongation-rupture, which itself is greater than 3%. This elongation Characteristic, elastic characteristic, of the cable cooperates advantageously with the above-mentioned setting angle of the cables in the layer 13 so as to not reduce the flexibility of the overall pipe arrangement.

The cables 12 are preferably metallic cables and the layer 13 is preferably a rubber material which, after vulcanization, connects each cable 12 with adjacent cables. This rubber material for layer 13 may be a commonly used mixture, however, a natural rubber layer is particularly preferred in accordance with the present invention, since such natural rubber layer results in an increase of the service life of the pipe. In order to protect the layer 13, particularly when formed of natural rubber, a thin layer 14 of polychloroprene covers the layer 13.

In a particular embodiment of the present invention, the cellular material layer 11 had a thickness of 8 cm and the metallic cables 12 utilized in layer 13 had a diameter of 0.92 mm with the cables consisting of an assembly of seven strands comprising three filaments (wires) each of 0.15 mm (total of 21 filaments). A pipe construction according to these dimensions and features exhibits remarkably advantageous behavior regarding withstanding shocks and abrasions.

Figure 3:
FIG. 3 is a schematic view illustrating a metallic cable construction used in another embodiment of a self-floating pipe constructed according to the present invention.
Figure 4:
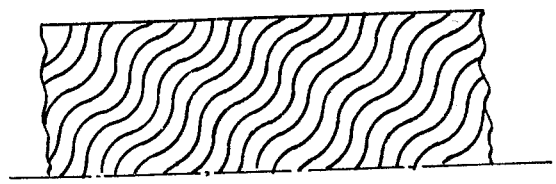
FIG. 4 is a view similar to FIG. 2, but showing utilization of the cable of FIG. 3.

According to other preferred embodiments of the present invention, the relative linear cables of the FIGS. 1 and 2 embodiment are replaced by undulated metallic cables as illustrated in FIG. 3. That is, permanent deformations are formed on the cable in the same plane, before the cables are wound onto the pipe, preferably at the time of the manufacture of the cables. The pitch and the amplitude of these undulations are selected as functions of the diameter of the cable, the diameter of the pipe, and the specific use for which the pipe is intended. These undulations in the cables give the cables a sinusoidal form or shape (see FIGS. 3 and 4). These undulated cables are positioned, as in the above described FIGS. 1 and 2 embodiment, with a setting angle in the range between 56° and 68° formed with the axial direction of the pipe, with the undulations being formed at opposite sides of the extension of the cables (see FIG. 3). The cables are applied with the undulations flat on the surface of the cellular material layer so that the undulations essentially lie in a cyclindrical surface (see FIG. 4). The undulated cables according to the embodiment of FIGS. 3 and 4 is advantageous in that the cables have an elongation reserve for absorbing shocks and abrasions against the surface of the pipe without permanent elongation of the cables. When the exterior stress or strain on the surface of the pipe is removed, these undulated cables reassume their initial undulated form. It will be understood that these undulated cables will provide a firm and rigid shield, in conjunction with the rubber layer 13, for the cellular material layer 11, while also providing a minimum of change to the flexibility of the overall pipe construction, due to their longitudinal resilience.

In preferred embodiments of the present invention, the cables 12 are formed of steel.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A self-floating flexible pipe comprising:
    a flexible pipe portion for conducting fluid,
    a floatation layer of cellular floatation material around said pipe portion to assure floatation of the pipe,
    and a protective sheathing layer around said floatation layer and including a layer of elastic material and cables embedded in said layer of elastic material, said cables being wound and undulated in a sinusoidal pattern along the length thereof such that shocks and abrasions against the surface of the pipe are absorbed without permanent elongation of the cables.

2. A self-floating flexible pipe according to claim 1, wherein said cables are wound with the surface defined by the sinusoidal pattern extending coaxially with the exterior surfaces of said pipe.

3. A self-floating flexible pipe according to claim 1, wherein said cables are wound at a setting angle with respect to the axis of the pipe of approximately 60°.

4. A self-floating flexible pipe according to claim 2, wherein said cables are helically arranged in said protective sheathing layer.

5. A self-floating flexible pipe according to claim 1, wherein said cables are helically arranged in said protective sheathing layer.

6. A self-floating flexible pipe according to claim 1, wherein said elastic material is rubber.

* * * * *

UNITED STATES PATENT OFFICE
CERTIFICATE OF CORRECTION

Patent No. 3,972,354          Dated August 3, 1976

Inventor(s)          CHAMPLEBOUX, et. al.

It is certified that error appears in the above-identified patent and that said Letters Patent are hereby corrected as shown below:

Title page as it reads now:

[30]     Foreign Application Priority Data

Feb. 5, 1973     France......... 43.04034

Title page as it should read:

[30]     Foreign Application Priority Data

Feb. 5, 1973     France......... 73.04034

Signed and Sealed this

Thirtieth Day of November 1976

[SEAL]

Attest:

RUTH C. MASON
*Attesting Officer*

C. MARSHALL DANN
*Commissioner of Patents and Trademarks*